No. 608,683. Patented Aug. 9, 1898.
J. JOHNSON.
SLIP HOOK.
(Application filed Nov. 6, 1897.)
(No Model.)
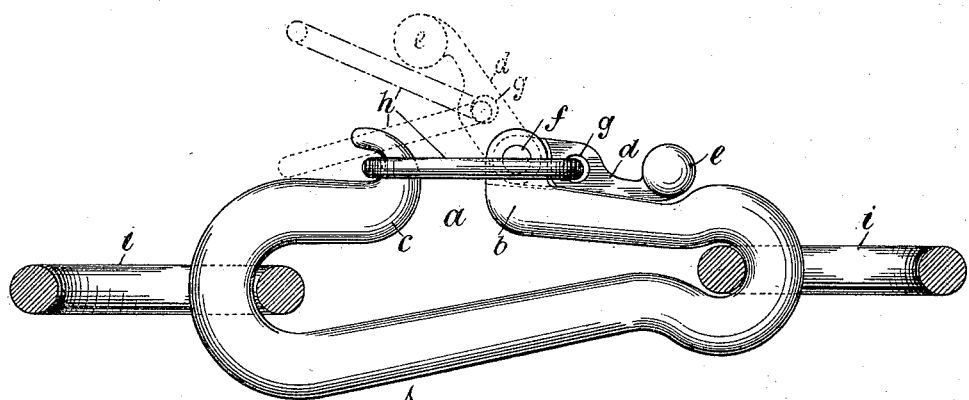
Fig. 1.
Fig. 2.
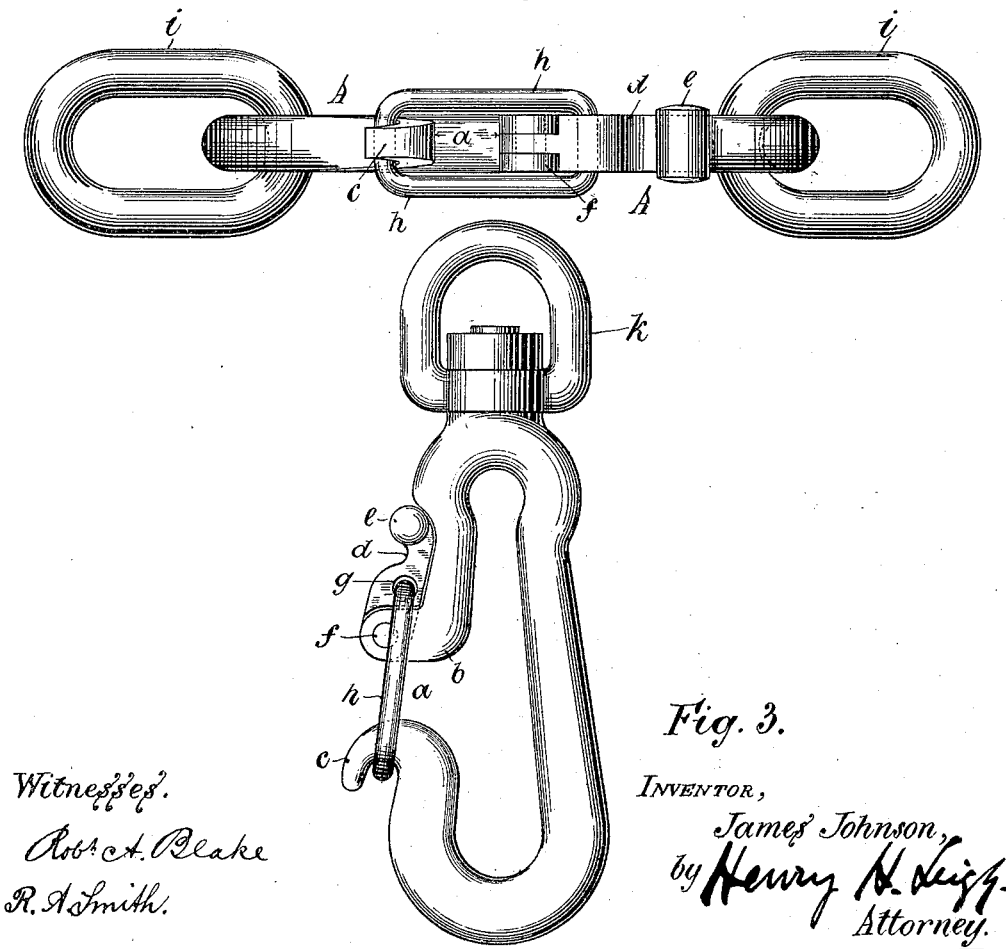
Fig. 3.
Witnesses.
Rob¹ A. Blake
R. A. Smith.
Inventor,
James Johnson,
by Henry H. Leigh
Attorney.

UNITED STATES PATENT OFFICE.

JAMES JOHNSON, OF BIRMINGHAM, ENGLAND.

SLIP-HOOK.

SPECIFICATION forming part of Letters Patent No. 608,683, dated August 9, 1898.

Application filed November 6, 1897. Serial No. 657,647. (No model.) Patented in England August 27, 1897, No. 19,750.

*To all whom it may concern:*

Be it known that I, JAMES JOHNSON, a subject of the Queen of the United Kingdom of Great Britain and Ireland, residing at No. 128 Colmore road, in the city of Birmingham and county of Warwick, England, have invented certain new and useful Improvements in Slip-Hooks, (for which I have obtained the following patent: Great Britain and Ireland, No. 19,750, dated August 27, 1897;) and I do hereby declare that the following is a full, clear, and exact description of the invention, reference being made to the accompanying drawings, which are to be taken as part of this specification and read therewith, and one which will enable others skilled in the art to which it appertains to make and use the same.

This invention has reference to certain improvements in slip-hooks of every description—that is, as regards their size and purpose for which they are made and also as regards the substance of which they are composed—for instance, whether of common or precious metal.

The invention also comprises the combination of the improved hook with a swivel, shackle, another hook or hooks, link or links, of any form.

The object of the present invention is to provide a perfectly secure and readily locked and unlocked fastening for such hooks.

According to my invention slip-hooks of any or every description are provided with a fastening or locking device consisting of a lever pivoted or hinged to the end of the hook on one side of the open or divided side thereof, which lever, hereinafter called the "locking-lever," is adapted by means of a knob or handle to be operated by hand, and a continuous ring or link passing loosely through a hole in the locking-lever and capable of passing over the other or hooked end of the open or divided side of the slip-hook when the lever is in its forward or released position only. The axis of the locking-lever when in its down or locked position and also the end of the locking-link nearest the said lever lie below the level center of the pivot or hinge of the said lever, and this is essential, as will be hereinafter explained.

In the accompanying drawings, forming part of this specification, Figure 1 is a side view of my improved slip-hook, shown connecting two portions of a chain cable, and illustrating the locking device in its locked, unlocked, and raised positions, the two latter positions being indicated in dotted lines. Fig. 2 is a plan of Fig. 1, and Fig. 3 is a side elevation of my improved slip-hook and locking device in combination with a swivel.

A denotes the slip-hook in general; *a*, the breech in the side of the slip-hook; *b*, the end of the hook to which the locking-lever is pivoted or hinged, and *c* is the other or hooked end of the slip-hook.

*d* is the lever, *e* being the head or handle and *g* the eye or hole of it.

*f* is the pivot or hinge about which the lever can oscillate, and *h* is the ring or link, hereinafter called the "locking-link."

*i i* are two links or portions of a chain cable connected together by the slip-hook A.

*k* is an ordinary swivel attachment or device.

By reference to the drawings it will be seen that the locking-lever when in its down or locked position retains the locking-link, or at least the end of it nearest the said lever, in such position that its center line or the greater part of it lies below the center of the pivot or hinge-pin upon which the locking-lever turns, by which provision no strain tending to raise the lever is occasioned by the pull of the load on the chain, which would be the case if this line fell level with or above the center of the said pivot or hinge-pin.

In Fig. 3 an illustration is given of one form of suitable combination of the slip-hook with an ordinary swivel. This is only given as an instance, and I do not bind myself to the combination of swivel nor to its exact position upon the slip-hook. A shackle, another hook or hooks, link or links, may take the place of the swivel according as required by the circumstances.

I claim—

1. A slip-hook having a breech in one side thereof the extremity of the hook on either side of the said breech being fashioned into a hook and eye respectively the said eye bearing a hand-lever hinged or pivoted thereto and a ring loosely threaded through a hole in the said lever adapted to be passed over and engage the hooked end on the opposite side of the breech in the side of the slip-hook as described and set forth.

2. A slip-hook having its free extremities fashioned into a hook and eye respectively a locking-lever pivoted or hinged to the said eye and a ring or link loosely threaded through a hole in the said lever and adapted to pass over the opposite free extremity of the slip-hook and be tightened or locked across the breech by the said lever in such manner that the axis of the said ring or link lies below the hinge-pin or pivot of the lever as described and set forth.

3. The combination with a slip-hook of a locking-lever pivoted or hinged to one of the free extremities of the hook and bearing a loose locking ring or link adapted to be passed over and engage with the opposite free extremity of the slip-hook and be tightened or locked across the breech so that its axis falls below the center of the hinge-pin or pivot of the locking-lever.

4. The combination with a slip-hook, consisting of the main hook with a breech, the free extremity on either side of the breech being a hook and eye respectively the said eye bearing a lever pivoted or hinged thereto and the said lever bearing a loose ring or link adapted to pass over and engage with the opposite free extremity of the slip-hook and be tightened or locked across the breech in such manner that its axis falls below the center of the hinge-pin of the locking-lever, of a swivel or shackle or divided link as described and set forth.

In witness whereof I have hereunto affixed my signature, in presence of two witnesses, this 15th day of October, 1897.

JAMES JOHNSON.

Witnesses:
A. H. SCROXTON,
F. J. FERRINGTON.